United States Patent [19]

Sasaki et al.

[11] Patent Number: 4,694,296
[45] Date of Patent: Sep. 15, 1987

[54] VEHICLE APPROACH SENSING APPARATUS

[75] Inventors: Kunihiko Sasaki, Nukata; Masao Kodera, Okazaki; Akira Kuno, Obu, all of Japan

[73] Assignees: Nippon Soken, Inc., Nishio; Nippondenso Co., Ltd., Kariya, both of Japan

[21] Appl. No.: 711,046

[22] Filed: Mar. 12, 1985

[30] Foreign Application Priority Data

Mar. 13, 1984 [JP] Japan .................................. 59-47661

[51] Int. Cl.$^4$ ........................ G08G 1/00; G01S 13/00; G01S 15/93
[52] U.S. Cl. .................................... 340/904; 340/903; 340/943; 340/62; 367/909
[58] Field of Search ................. 340/903, 904, 943, 62, 340/104; 367/91, 909, 98

[56] References Cited

U.S. PATENT DOCUMENTS

| | | | |
|---|---|---|---|
| 3,442,347 | 5/1969 | Hodgson et al. | 367/909 |
| 3,662,328 | 5/1972 | Spivak | 340/903 |
| 3,716,822 | 2/1973 | Tsuruta | 367/909 |
| 3,749,197 | 7/1973 | Deutsch | 340/62 |
| 4,490,716 | 12/1984 | Tsuda | 340/904 |
| 4,491,840 | 1/1985 | Nishikawa | 367/909 |
| 4,543,577 | 9/1985 | Tachibana et al. | 340/904 |
| 4,549,181 | 10/1985 | Tachibana et al. | 340/904 |
| 4,556,861 | 12/1985 | Hyodo et al. | 340/62 |

Primary Examiner—John W. Caldwell, Sr.
Assistant Examiner—Ruffin B. Cordell
Attorney, Agent, or Firm—Cushman, Darby & Cushman

[57] ABSTRACT

An apparatus capable of sensing sudden approach of a succeeding vehicle and emitting an alarm, while being free from malfunction that may otherwise be caused by the noise from the succeeding vehicle which has approached at a normal speed and stopped in the proximity. The sensing apparatus includes a transmitter disposed in a rear bumper of a vehicle for transmitting ultrasonic waves toward a succeeding vehicle; a receiver disposed in the rear bumper for receiving the ultrasonic waves reflected from the succeeding vehicle; a circuit for detecting the approach speed of the succeeding vehicle from the difference between the frequencies of the reflected waves and the transmitted waves, and generating an alarm signal when the detected approach speed has exceeded a predetermined value; a circuit for detecting the approach distance of the succeeding vehicle at a normal speed from the signal strength of the reflected ultrasonic waves, and interrupting the action of the ultrasonic transmitter and receiver when the detected distance has become shorter than a predetermined value; and an alarm activated in response to the alarm signal and giving a warning of danger to drivers of both the apparatus-installed vehicle and the succeeding one.

10 Claims, 4 Drawing Figures

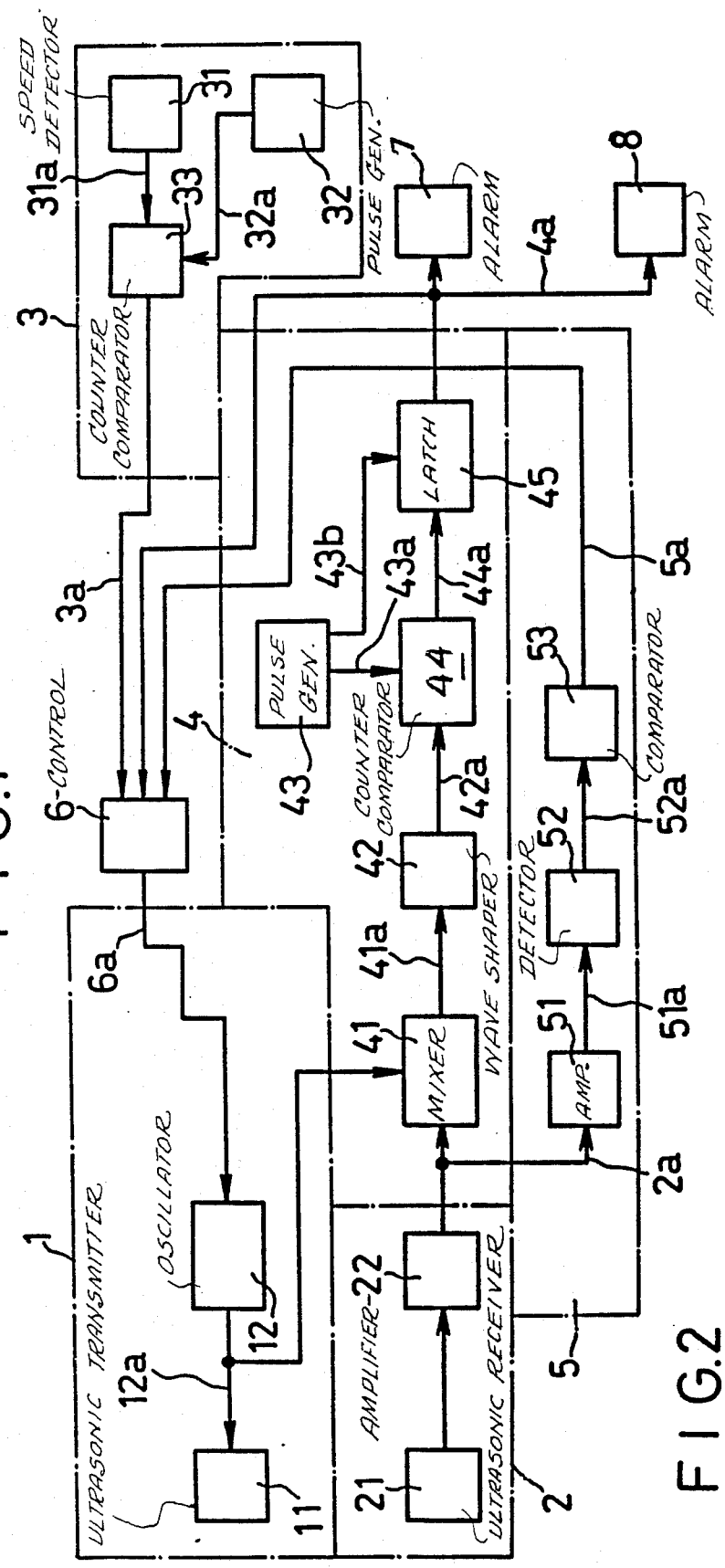
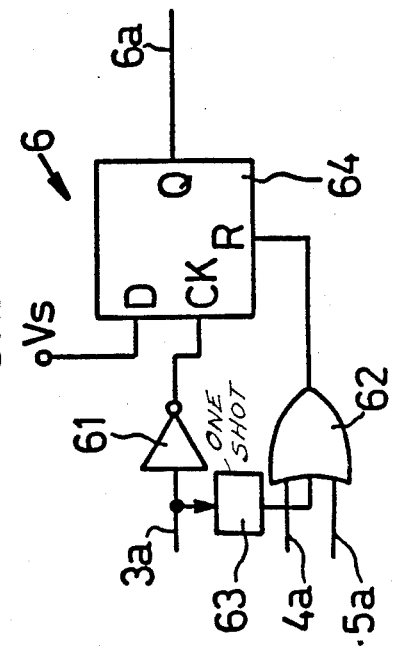
FIG.1
FIG.2

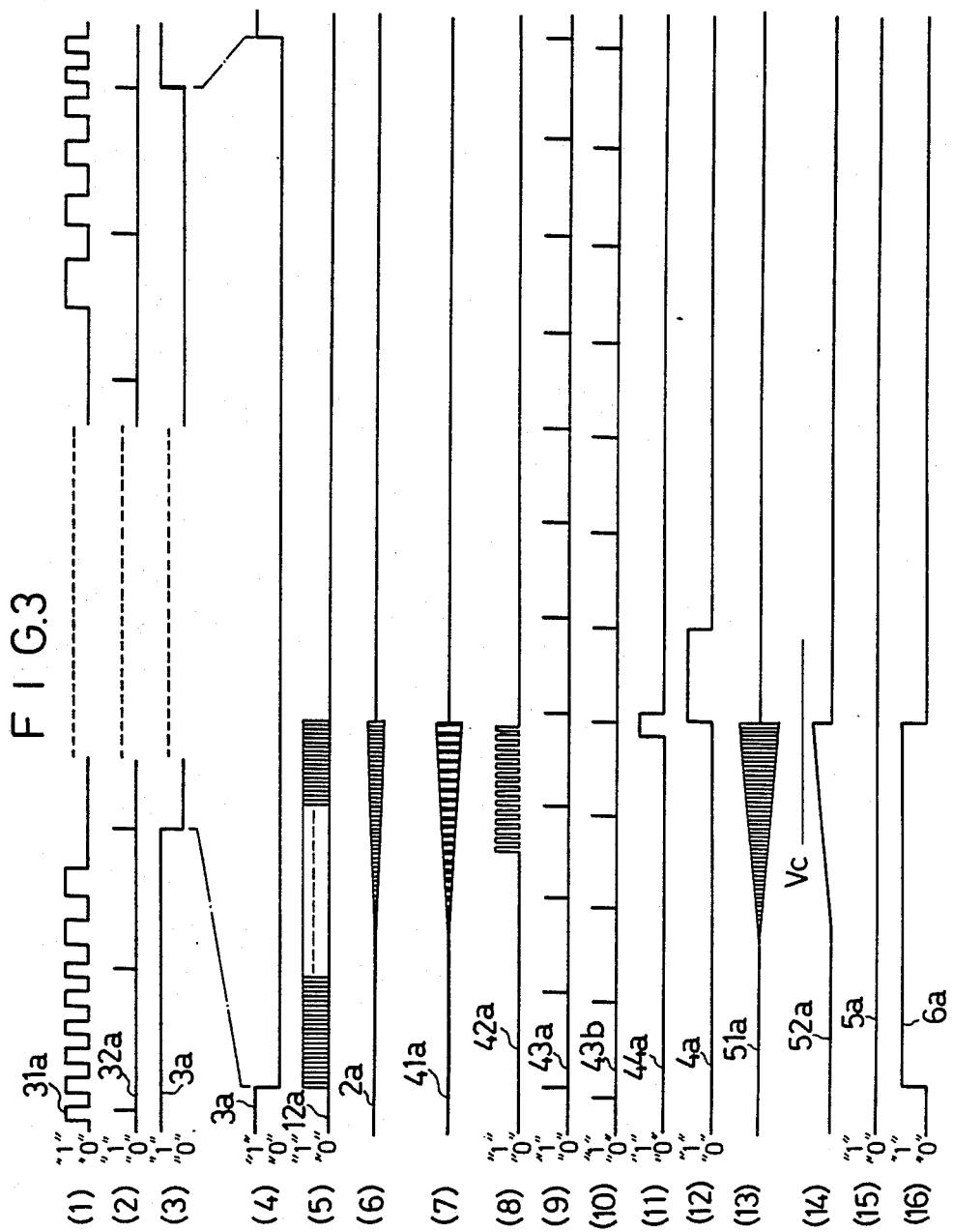

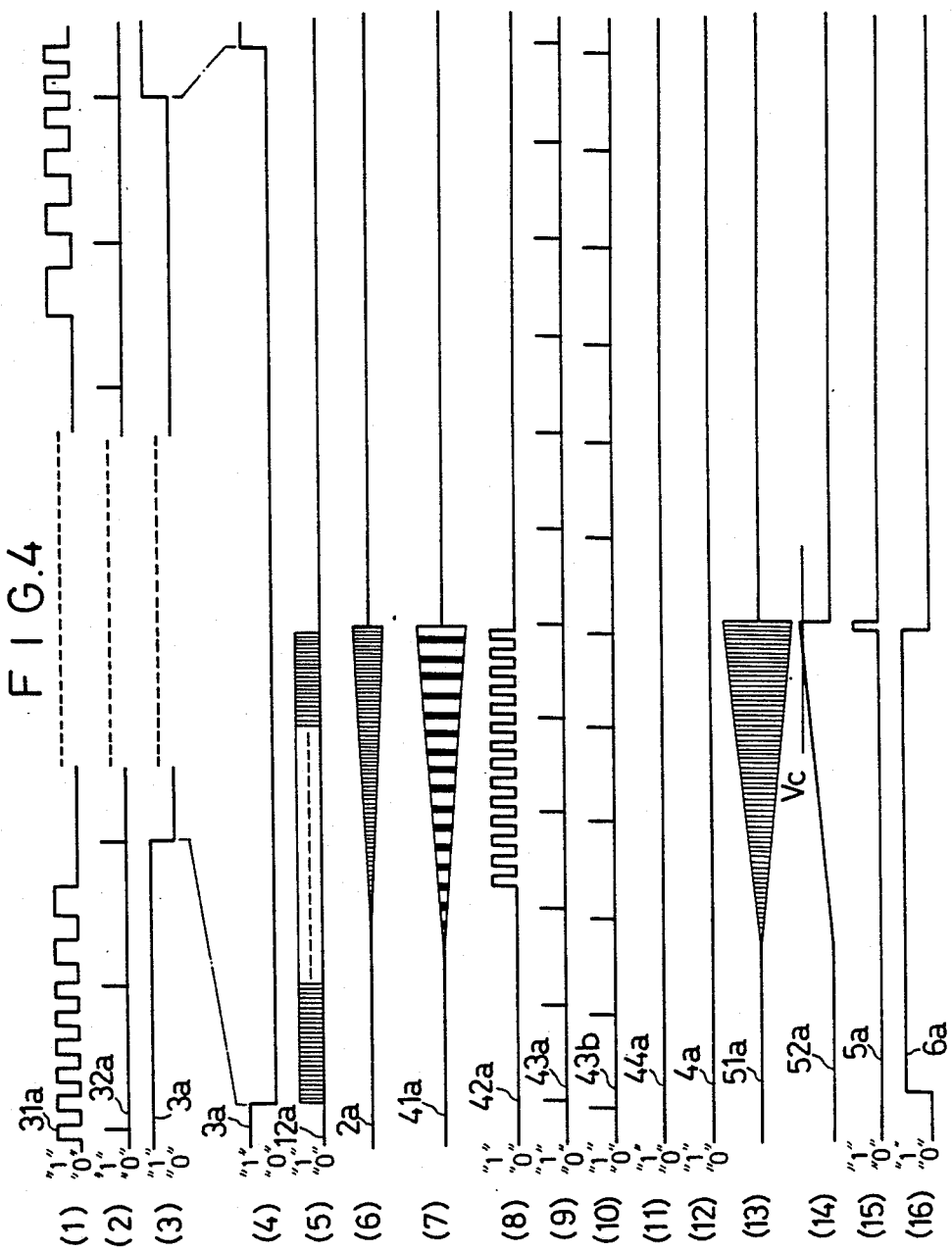

VEHICLE APPROACH SENSING APPARATUS

BACKGROUND OF THE INVENTION

The present invention relates to an apparatus for sensing sudden approach of one vehicle to another and emitting an alarm representative of such approach.

At a street intersection or the like, there occasionally occurs a careless sudden approach of one vehicle to another. A preceding vehicle at a halt thus may be approached by a succeeding vehicle due to careless driving. An accident is preventable if an alarm can be emitted to a driver by sensing such sudden approach.

Of the conventional approach sensing apparatus known heretofore, a type utilizing ultrasonic waves is considered advantageous in view of its relatively simple structure and high antinoise characteristic. However, since some ultrasonic component is included in the noise generated from a cooling fan and so forth of a vehicle engine, a problem arises in the sensing apparatus. Thus when any vehicle running at a normal speed has approached and stopped in the proximity of the apparatus-installed vehicle, malfunction may be induced by sensing the approach due to such noise from the cooling fan and so forth.

SUMMARY OF THE INVENTION

It is an object of the present invention to provide an apparatus for sensing sudden approach of a vehicle by utilizing ultrasonic waves and emitting an alarm.

Another object of the invention resides in providing a vehicle approach sensing apparatus which is free from malfunction or erroneous sensing despite noise generated from any other vehicle at a stop in the proximity thereof.

The vehicle approach sensing apparatus of the present invention comprises: (1) ultrasonic transmission-reception means disposed in a front or rear portion of a vehicle and, in response to a high-frequency drive signal fed thereto, transmitting ultrasonic waves to a preceding or succeeding vehicle, then receiving the ultrasonic waves reflected from the preceding or succeeding vehicle, and generating a reception signal varied in accordance with the strength of the received ultrasonic signal; (2) approach speed detection means for detecting the approach speed to the preceding vehicle or that of the succeeding one from the reception signal and emitting an alarm signal when the detected approach speed is higher than a predetermined value; (3) approach distance detection means for detecting the approach distance to the preceding vehicle or that of the succeeding one from the reception signal and interrupting the action of the ultrasonic transmission-reception means when the detected approach distance is shorter than a predetermined value; and (4) alarm means activated by the alarm signal.

BRIEF DESCRIPTION OF THE DRAWINGS

FIG. 1 is a block diagram showing the constitution of a sensing apparatus according to the present invention;

FIG. 2 is a circuit diagram of an ultrasonic transmission control circuit;

FIG. 3 is a timing chart of individual signals produced in the apparatus of FIG. 1 in response to sudden approach of a succeeding vehicle; and FIG. 4 is a timing chart of individual signals produced in the apparatus of FIG. 1 in response to approach of a succeeding vehicle at a normal speed.

DETAILED DESCRIPTION OF THE PREFERRED EMBODIMENT

Hereinafter the present invention will be described with reference to a preferred embodiment thereof. The following is an exemplary case where the apparatus of this invention is employed for the purpose of sensing a sudden approach of a succeeding vehicle by an apparatus-installed vehicle brought to a stop at a street intersection or the like.

In FIG. 1, an ultrasonic transmission circuit 1 comprises an ultrasonic transmitter 11 disposed in a rear bumper or the like of a vehicle and an oscillator 12 for outputting a high-frequency drive signal 12a to the transmitter 11. An ultrasonic reception circuit 2 comprises an ultrasonic receiver 21 disposed in the rear bumper or the like at a position proximate to the transmitter 11, and an amplifier 22 for amplifying the input signal fed to the receiver 21. A running speed detection circuit 3 comprises a speed detector 31 connected to the axle of the vehicle for outputting speed pulses 31a proportional to the rotation rate of the axle, a pulse generator 32 for outputting a pulse signal 32a of a fixed period, and a counter-comparator 33 for counting the speed pulses 31a during input of the pulse signal 32a and generating a low running speed signal 3a of a "0" level when the counted number is smaller than a predetermined value.

An approach speed detection circuit 4 comprises a mixer 41 for frequency-mixing the signal 2a amplified by the amplifier 22 with the drive signal 12a outputted from the oscillator 12, a waveform shaper 42 for correctively shaping the waveform of the output signal 41a of the mixer 41 and producing an output signal 42a, a pulse generator 43 for outputting a pulse signal 43a of a fixed period, a counter-comparator 44 for counting the pulses of the shaper output signal 42a during input of the pulse signal 43a and outputting an excess approach speed signal 44a of a "1" level when the counted value is greater than a predetermined value, and a latch circuit 45 set by the signal 44a and generating an alarm signal 4a. An approach distance detection circuit 5 comprises an amplifier 51 for further amplifying the received signal 2a, a detector 52 for rectifying and detecting the amplified signal 51a, and a comparator 53 for outputting an approach signal 5a when the detected signal 52a has exceeded a predetermined voltage Vc.

An ultrasonic oscillation control circuit 6 functions in response to the aforesaid low running speed signal 3a, alarm signal 4a and approach signal 5a and generates an ultrasonic oscillation command signal 6a.

Alarms 7 and 8 are activated by the alarm signal 4a and serve to warn drivers of the stopping and succeeding vehicles respectively. The alarm 8 may also have a function of a brake lamp located in a rear portion of the vehicle.

FIG. 2 is an exemplary connection diagram of the control circuit 6, which consists of an inverter 61, an OR gate 62, a one-shot multivibrator 63 for generating a pulse at the rise of a signal, and a D-type flip-flop 64. The low running speed signal 3a is fed to both the inverter 61 and the one-shot multivibrator 63, while the alarm signal 4a and the approach signal 5a are fed to the OR gate 62. The oscillation command signal 6a is an output from a Q-terminal of the flip-flop 64 and is set to a "1" level when the low running speed signal 3a of a "0" level is inputted. The command signal 6a is reset at a change of the signal 3a to a "1" level or when the alarm signal 4a or the approach signal 5a are inputted.

Hereinafter the operation of the above approach sensing apparatus will be described with reference to FIGS. 3 and 4.

When the running vehicle is slowed down to halt at a street intersection or the like, the number of speed pulses 31a (FIG. 3 (1)) generated cyclically during the period of a pulse signal 32a (FIG. 3 (2)) is gradually decreased and, upon reduction of the number below a predetermined value, a low running speed signal 3a (FIG. 3 (3) and (4)) of a "0" level is outputted. Then the control circuit 6 generates an oscillation command signal 6a (FIG. 3 (16)) in response to the signal 3a and feeds a high-frequency drive signal 12a (FIG. 3 (5)) to the ultrasonic transmitter 11, thereby causing the same to emit ultrasonic waves.

The ultrasonic waves thus transmitted are reflected from a succeeding vehicle and then are received by the receiver 21, whose output is amplified to form a reception signal 2a (FIG. 3 (6)). The amplitude of the reception signal 2a gradually increases with sequential approach of the succeeding vehicle as shown, and its frequency becomes higher than that of the aforesaid high-frequency pulse 12a in proportion to the approach speed of the succeeding vehicle due to the Doppler effect. The signals 2a and 12a are frequency-mixed by means of the mixer 41 to produce an output signal 41a (FIG. 3 (7)) of a frequency proportional to the difference between the two frequencies. The output signal 41a thus obtained is shaped into a signal 42a (FIG. 3 (8)) of a rectangular waveform, and the counter-comparator 44 counts the pulses 42a during the input period of the pulse signal 43a (FIG. 3 (9)). When the number of pulses 42a counted has exceeded a predetermined value to signify that the approach speed of the succeeding vehicle is excessive, an excess approach speed signal 44a (FIG. 3 (11)) is outputted to set the latch circuit 45, thereby generating an alarm signal 4a (FIG. 3 (12)). As a result, the alarms 7 and 8 are activated to warn drivers of the stopping and succeeding vehicles respectively.

The signal 4a is set or reset synchronously with the output pulse signal 43b (FIG. 3 (10)) of the pulse generator 43. And upon occurrence of the aforesaid abnormal approach, the oscillation command signal 6a is reset by the alarm signal 4a to halt oscillation of ultrasonic waves. In this case, the detected signal 52a (FIG. 3 (14)) of the signal 51a (FIG. 3 (13)) obtained by amplifying the received signal 2a is reset without being increased to a predetermined voltage Vc, so that an approach signal 5a is not outputted (FIG. 3 (15)). The mixer 41 is placed in a nonoperating states when the high-frequency pulse 12a is no longer inputted thereto.

FIG. 4 shows the individual states of the above signals assumed when the succeeding vehicle approaches at a sufficiently low speed. The difference between this case and the aforesaid abnormal approach will now be described below.

In this case, the number of the pulses 42a (FIG. 4 (8)) proportional to the approach speed of the succeeding vehicle never exceeds a predetermined value, so that an alarm signal 4a is not generated (FIG. 4 (12)). Meanwhile the amplitude of the amplified signal 51a is gradually increased with sequential approach of the succeeding vehicle, and therefore the detected signal 52a (FIG. 4 (14)) finally comes to exceed the predetermined voltage Vc, whereby the approach signal 5a (FIG. 4 (15)) is outputted to reset the oscillation command signal 6a (FIG. 4 (16)).

In general, some ultrasonic component is included in the noise generated from a cooling fan and so forth of any vehicle. Accordingly, when the noise from the succeeding vehicle stopped in the proximity is caught by the receiver 21, there may arise a problem of malfunction that the sensing apparatus erroneously detects such a state as abnormal approach of the succeeding vehicle. In the present invention, however, when the succeeding vehicle approaching at a normal speed has stopped in the proximity, the oscillation command signal 6a is terminated to halt generation of the high-frequency pulse signal 12a while the mixer 41 is deenergized, so that no problem is existent with respect to such erroneous detection. Of course, when the succeeding vehicle has left the proximity, the oscillator command signal can again be activated by the proper stimulus.

Although ultrasonic waves are transmitted during a stop of the apparatus-installed vehicle despite the absence of any succeeding vehicle, when the running speed of the former vehicle increases posterior to its start, the low running speed signal 3a is turned to a "1" level (as shown at right ends in FIG. 4 (3) and (4)), a reset pulse is outputted from the one-shot multivibrator 63 of the control circuit 6 (FIG. 2) to reset the oscillation command signal 6a.

As described hereinabove, according to the vehicle approach sensing apparatus of this invention wherein ultrasonic waves reflected from a succeeding vehicle are received to sense sudden approach thereof with certainty, an alarm of danger is emitted immediately to prevent an accident that may otherwise be caused by careless driving. With regards to any succeeding vehicle which approaches at a normal speed and stops in the proximity, the sensing apparatus is placed in a nonoperating state and therefore no erroneous detection is induced by the noise generated from the succeeding vehicle.

In the above embodiment equipped with a running speed detection circuit, ultrasonic waves are transmitted merely during a stop of the apparatus-installed vehicle, so that the load on its battery is lightened.

It is to be understood that the present invention is not limited to the aforesaid embodiment alone which senses approach of a succeeding vehicle. For example, in a modification where an ultrasonic transmitter 11 and an ultrasonic receiver 12 are disposed in a front portion of the vehicle, it becomes possible to sense sudden approach thereof to a preceding vehicle as well. In this case, the running speed detection circuit may not be used.

By utilizing the Doppler effect of ultrasonic waves as in the above-mentioned embodiment, the relative approach speed between two vehicles is rendered measurable. Therefore, the vehicle being approached need not be at a halt exactly and may be in a running state.

The circuits in the above embodiment may be partially replaced with a computer program.

The ultrasonic transmitter and receiver may be combined with each other to constitute a single transceiver. In such a case, transmission and reception of ultrasonic waves are performed alternately.

What is claimed is:

1. A vehicle approach sensing apparatus installed in a first of two vehicles for detecting a condition wherein one vehicle is getting closer to another vehicle at an approach speed higher than a predetermined speed threshold, comprising:

ultrasonic transmission-reception means disposed in the one vehicle and which can be selectably started and stopped, for transmitting ultrasonic waves to the another vehicle in response to a drive signal fed thereto, and for then receiving the ultrasonic waves reflected from the another vehicle, and generating a reception signal which is varied in proportion with a strength of the received ultrasonic waves;

running speed detection means for detecting a running speed of the one vehicle and for starting said transmissionreception means when the detected running speed is decreased across a first threshold value and for stopping said transmission-reception means when said running speed detection means is increased across a second threshold value;

approach speed detection means for detecting an approach speed between the one and the another vehicles from the reception signal and for producing an alarm signal and simultaneously stopping said ultrasonic transmission-reception means when the detected approach speed is higher than the predetermined speed threshold; and approach distance detection means for detecting an approach distance between the one and the another vehicles from the reception signal and stopping said ultrasonic transmissionreception means when the detected approach distance is shorter than a predetermined value.

2. The sensing apparatus as defined in claim 1, wherein said approach speed detection means detects the approach speed from the difference between the frequencies of the drive signal and the reception signal.

3. The sensing apparatus as defined in claim 2, wherein said approach speed detection means comprises mixer means for mixing the drive signal and the reception signal as input signals thereto and producing output pulses having a frequency equal to the difference between the frequencies of the two input signals, and counter-comparator means for counting said output pulses and generating an alarm signal when the counted value has exceeded a predetermined counted value.

4. The sensing apparatus as defined in claim 1, wherein said approach distance detection means detects the approach distance based on the signal amplitude of said reception signal, in accordance with an approach to the another vehicle and interrupts the action of said ultrasonic transmission-reception means when the signal level exceeds a predetermined signal level.

5. The sensing apparatus as defined in claim 1, wherein said approach distance detection means comprises means for rectifying and demodulating the reception signal, and comparator means for generating a signal to stop the action of said ultrasonic transmission-reception means when a signal level of the demodulated signal exceeds a predetermined demodulated signal level.

6. The sensing apparatus as defined in claim 1, wherein said running speed detection means comprises a speed detector connector to the axle of the one vehicle which outputs speed pulses proportional to the rotation of said axle, and counter-comparator means for counting the speed pulses periodically and generating a signal to start the action of said ultrasonic transmission-reception means when the counted value decreases across a predetermined counted value of said speed pulses.

7. The apparatus as in claim 1 further comprising means for providing an alarm indication in response in response to said alarm signal.

8. A method for sensing the approach of one vehicle to another vehicle, comprising the steps of:
detecting a running speed of a first vehicle;
transmitting ultrasonic waves from the first vehicle toward a second vehicle when said detected running speed detected by said detecting step is within a predetermined range of values;
receiving ultrasonic waves reflected from the second vehicle;
detecting an approach speed between the first and second vehicles from said ultrasonic waves received in said receiving step;
detecting an approach distance between the first and second vehicles from said ultrasonic waves received in said receiving step;
causing an alarm when said approach speed is not less than a first predetermined value; and
stopping said receiving step when at least one of: (a) said approach distance detected by said distance detecting step becomes not more than a second predetermined value, (b) said approach speed becomes not less than a third predetermined value, and (c) said running speed of said first vehicle is increased across a fourth predetermined value, thereby temporarily interrupting the sensing action when the second vehicle is sufficiently close to the first vehicle to cause a probability of interferring with ultrasound transmission and reception.

9. A vehicle approach sensing apparatus comprising:
ultrasonic transmission-reception means disposed in a rear portion of a vehicle, for operating in response to a drive signal fed thereto by transmitting ultrasonic waves to a succeeding vehicle, then receiving the ultrasonic waves reflected from the succeeding vehicle, and generating a reception signal which is varied in proportion with a strength of the received ultrasonic waves;

running speed detection means for detecting a running speed and for starting said transmission-reception means when the detected running speed is decreased across a first predetermined value and for stopping said transmission-reception means when said detected running speed is increased across a second predetermined value;

approach speed detection means for determining an approach speed of the succeeding vehicle from the reception signal and producing an alarm signal when the detected approach speed is higher than a predetermined approach speed;

approach distance detection means for detecting an approach distance to the succeeding vehicle from the reception signal, and for interrupting an operating of said ultrasonic transmission-reception means when the detected approach distance is shorter than a predetermined approach distance;

alarm means for issuing an alarm based on the alarm signal.

10. A method as in claim 9 wherein said stopping step also stops said transmitting step.

* * * * *